(12) United States Patent
Roller et al.

(10) Patent No.: US 6,811,287 B2
(45) Date of Patent: Nov. 2, 2004

(54) SINGLE LIGHT-EMITTING DIODE VEHICLE LAMP

(75) Inventors: Philip C. Roller, Ashville, NY (US); Todd H. Kolstee, North Clymer, NY (US); Christopher A. Ross, Corry, PA (US)

(73) Assignee: Truck-Lite Co., Inc., Falconer, NY (US)

( * ) Notice: Subject to any disclaimer, the term of this patent is extended or adjusted under 35 U.S.C. 154(b) by 0 days.

(21) Appl. No.: 10/379,319

(22) Filed: Mar. 3, 2003

(65) Prior Publication Data

US 2003/0165065 A1 Sep. 4, 2003

Related U.S. Application Data

(60) Provisional application No. 60/450,564, filed on Feb. 28, 2003, and provisional application No. 60/361,269, filed on Mar. 2, 2002.

(51) Int. Cl.$^7$ .................................................. F21V 5/00
(52) U.S. Cl. ...................... 362/336; 362/522; 362/545
(58) Field of Search .............................. 362/545, 327, 362/330, 331, 332, 336, 337, 339, 520, 521, 522, 541, 547

(56) References Cited

U.S. PATENT DOCUMENTS

| | | | | |
|---|---|---|---|---|
| 2,003,804 A | * | 6/1935 | Falge | 362/327 |
| D248,690 S | | 7/1978 | Nagel | D48/32 A |
| 4,146,883 A | | 3/1979 | Appledorn et al. | 340/378.2 |
| 4,733,335 A | | 3/1988 | Serizawa et al. | 362/80 |
| 4,935,665 A | | 6/1990 | Murata | 313/500 |
| 4,951,179 A | | 8/1990 | Machida | 362/61 |
| 5,038,255 A | | 8/1991 | Nishihashi et al. | 362/61 |
| 5,101,326 A | | 3/1992 | Roney | 362/61 |
| 5,388,035 A | | 2/1995 | Bodem, Jr. | 362/61 |
| 5,567,036 A | | 10/1996 | Theobald et al. | 362/80 |
| 5,632,551 A | | 5/1997 | Roney et al. | 362/249 |
| 5,700,080 A | | 12/1997 | Okuda | 362/80 |
| 5,746,497 A | | 5/1998 | Machida | 362/80 |
| 5,844,479 A | | 12/1998 | Walton | 340/479 |
| 5,934,798 A | | 8/1999 | Roller et al. | 362/497 |
| 6,183,100 B1 | | 2/2001 | Suckow et al. | 362/35 |
| 6,234,646 B1 | | 5/2001 | Ito | 362/235 |
| 6,241,373 B1 | | 6/2001 | Kelley et al. | 362/545 |
| 6,252,350 B1 | | 6/2001 | Alvarez | 313/498 |
| 6,283,621 B1 | * | 9/2001 | Macri | 362/337 |
| 6,296,376 B1 | | 10/2001 | Kondo et al. | 362/310 |
| 6,305,830 B1 | * | 10/2001 | Zwick et al. | 362/520 |
| 6,612,728 B2 | * | 9/2003 | Roller et al. | 362/521 |

FOREIGN PATENT DOCUMENTS

| | | | |
|---|---|---|---|
| DE | 657823 C | 3/1938 | F21S/8/10 |
| DE | 3438154 | 4/1986 | F21V/13/04 |
| EP | 0940331 | 8/1999 | B62J/6/04 |
| GB | 340522 A | 7/1929 | F21S/8/10 |

OTHER PUBLICATIONS

U.S. patent application Publication No. 20010007739 A1, Eibofner et al, Published Jul. 12, 2001, filed Dec. 8, 2000, Application No. 09/733,326/PCT Publication No. 02/04857A1, Roller et al, Published Jan. 17, 2002, International Filing Date Jul. 9, 2001.

* cited by examiner

Primary Examiner—Y My Quach Lee
(74) Attorney, Agent, or Firm—The Bilicki Law Firm, P.C.

(57) ABSTRACT

A vehicular lamp employs a single, high-flux light emitting diode as a light source, and is capable of performing stop, tail, turn and marker functions. The vehicular lamp can satisfy the Federal Motor Vehicle Safety Standard 108, as well as Society of Automotive Engineers Standards J585 (3/00), J1395 (6/91), J1398 (6/91), and J592 (12/94).

12 Claims, 8 Drawing Sheets

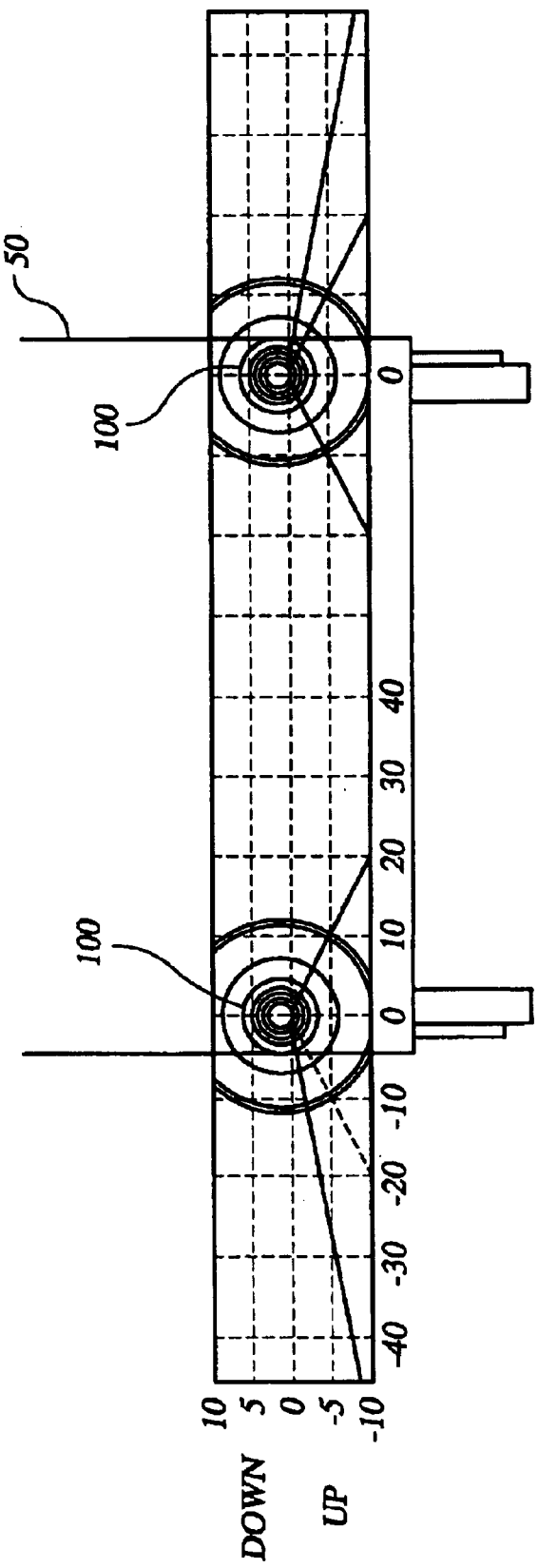

SINGLE LIGHT-EMITTING DIODE VEHICLE LAMP

PRIORITY CLAIM

The present application claims priority to U.S. Provisional Patent Application, Ser. No. 60/361,269, filed Mar. 2, 2002, which is incorporated by reference herein, and U.S. Provisional Patent Application, Ser. No. 60/450,564 filed Feb. 28, 2003, which is incorporated by reference herein.

FIELD OF THE INVENTION

The present invention relates generally to a vehicular lamp, more particularly to a light emitting diode vehicular lamp, and even more particularly, to a light emitting diode vehicular lamp that uses a single high-flux light emitting diode as a light source to satisfy the requirements, including photometric requirements, of a combination stop/tail/turn/marker vehicle light.

BACKGROUND OF THE INVENTION

The Department of Transportation (DOT), in its Federal Motor Vehicle Safety Standards, 49 C.F.R. §571.108 (2000), ("FMVSS 108") has adopted certain versions of the Society of Automotive Engineers (SAE) standards for stop/tail/turn/marker vehicular lamps. DOT Standard 592e (part of FMVSS 108) and SAE Standard J592e provides test procedures, requirements and guidelines for clearance, side marker, and identification lamps.

DOT Standard 585 (part of FMVSS 108) and SAE Standard J585 define a tail lamp as a lamp used to designate the rear of a vehicle by a steady burning low intensity light. These standards also provide that a tail lamp is a lamp installed on the rear of a vehicle and spaced as far apart laterally as practicable so that the signal will be clearly visible and its intent clearly understood.

DOT Standard 1395 (part of FMVSS 108) and SAE Standard J1395 define a turn signal lamp as a lamp that indicates a change in direction by giving a flashing light on the side toward which the turn or lane change will be made. These standards also provide that a turn signal lamp is a lamp, facing rearward for the rear lamp and facing forward for the front lamp, mounted on the permanent structure of the vehicle, at the same height and spaced as far apart laterally as practicable so that the signal will be clearly visible.

DOT Standard 1398 (part of FMVSS 108) and SAE Standard J1398 define a stop lamp as a lamp giving a steady light to the rear of a vehicle to indicate the intention of the operator of the vehicle to stop or diminish speed by braking. These standards further provide that stop lamps shall be mounted on the permanent structure of the vehicle, facing rearward, at the same height and spaced as far apart laterally as practicable, so that the signal will be clearly visible.

DOT and SAE standards also specify certain requirements, such as photometric requirements, for vehicular lamps functioning as stop, tail, turn and/or marker lamps, including luminous intensity requirements. According to the aforementioned standards, sufficient luminous intensity must exist at various points in the illumination zone. The specific photometric requirements of the most recent versions of the SAE Standards (i.e., J585 (March 2000), J1395 (June 1991), J1398 (June 1991), J592 (December 1994)) are set forth hereinbelow for stop/tail/turn/marker vehicular lamps.

TABLE 1

STOP LAMP PHOTOMETRIC PERFORMANCE REQUIREMENTS J1398

| Zone | Test Point Deg. | Zone Total Luminous Intensity, Candela, Red |
|---|---|---|
| 1 | 10U-5L<br>5U-20L<br>5D-20L<br>10D-5L | 50 |
| 2 | 5U-10L<br>H-10L<br>5D-10L | 100 |
| 3 | 5U-V<br>H-5L<br>H-V<br>H-5R<br>5D-V | 380 |
| 4 | 5U-10R<br>H-10R<br>5D-10R | 100 |
| 5 | 10U-5R<br>5U-20R<br>5D-20R<br>10D-5R | 50 |
| Maximum Luminous Intensity, Candela | | 300.0 |

1. The maximum luminous intensity shall not be exceeded over any area larger than that generated by a 0.5 degree radius within the area defined by the test point pattern of Table 2.
2. Unless otherwise specified, the lamp shall be considered to have failed the photometric requirements of this document if the luminous intensity at any test point is less than 60% of the values specified in Table 2.
3. Unless otherwise specified, the lamp shall be considered to have failed the photometric requirements of this document if the minimum luminous intensity between test points is less than 60% of the lower design values of Table 2 for the closest adjacent test points on a horizontal and vertical line as defined by the test point pattern.
4. The summation of the luminous intensity measurements at the specified test points in the zone shall be at least the values shown.
5. When a tail lamp or a clearance lamp is combined with a stop lamp, see 6.1.5.2 of this document for luminous intensity ratio requirements.
6. Throughout the photometric pattern defined by the corner points of 20U-45R, 10D-45R, and 10D-45L, the light intensity shall not be less than 0.4 candela in red.

TABLE 2

STOP LAMP PHOTOMETRIC DESIGN GUIDELINES J1398

| Test Point Deg. | Luminous Intensity, Candela, Red |
|---|---|
| 10U-5L | 16.0 |
| 5R | 16.0 |
| 5U-20L | 10.0 |
| 10L | 30.0 |
| V | 70.0 |
| 10R | 30.0 |
| 20R | 10.0 |
| H-10L | 40.0 |
| 5L | 80.0 |
| V | 80.0 |
| 5R | 80.0 |
| 10R | 40.0 |
| 5D-20L | 10.0 |
| 10L | 30.0 |
| V | 70.0 |
| 10R | 30.0 |
| 20R | 10.0 |
| 10D-5L | 16.0 |
| 5R | 16.0 |
| Maximum Luminous Intensity, Candela | 300.0 |

TABLE 2-continued

STOP LAMP PHOTOMETRIC DESIGN GUIDELINES J1398

| Test Point Deg. | Luminous Intensity, Candela, Red |
|---|---|

1. The maximum luminous intensity shall not be exceeded over any area larger than that generated by a 0.25 degree radius within the area defined by the test point pattern of Table 2.
2. When a tail lamp or a clearance lamp is combined with a stop lamp, see 6.1.5.2 of this document for luminous intensity ratio requirements.
3. Throughout the photometric pattern defined by the corner points of 20U-45L, 20U-45R, 10D-45R, and 10D-45L, the light intensity shall be not less than 0.4 candela in red.

TABLE 3

TAIL LAMP PHOTOMETRIC REQUIREMENTS (1)(2) J585

| Zone | Test Points (Degrees) | Minimum Luminous Intensity (cd)(3) Number Lighted Sections 1 | Minimum Luminous Intensity (cd)(3) Number Lighted Sections 2 | Minimum Luminous Intensity (cd)(3) Number Lighted Sections 3 | Zone Total Luminous Intensity (cd)(4) Number Lighted Sections 1 | Zone Total Luminous Intensity (cd)(4) Number Lighted Sections 2 | Zone Total Luminous Intensity (cd)(4) Number Lighted Sections 3 |
|---|---|---|---|---|---|---|---|
| I | 10U 5L | 0.4 | 0.7 | 1.0 | 1.4 | 2.4 | 3.4 |
|  | 5U 20L | 0.3 | 0.5 | 0.7 |  |  |  |
|  | 5D 20L | 0.3 | 0.5 | 0.7 |  |  |  |
|  | 10D 5L | 0.4 | 0.7 | 1.0 |  |  |  |
| II | 5U | 0.8 | 1.4 | 2.0 | 2.5 | 4.2 | 6.0 |
|  | H 10L | 0.8 | 1.4 | 2.0 |  |  |  |
|  | 5D | 0.8 | 1.4 | 2.0 |  |  |  |
| III | 5U V | 1.8 | 3.1 | 4.5 | 9.6 | 16.7 | 24.0 |
|  | H 5L | 2.0 | 3.5 | 5.0 |  |  |  |
|  | H V | 2.0 | 3.5 | 5.0 |  |  |  |
|  | H 5R | 2.0 | 3.5 | 5.0 |  |  |  |
|  | 5D V | 1.8 | 3.1 | 4.5 |  |  |  |
| IV | 5U | 0.8 | 1.4 | 2.0 | 2.4 | 4.2 | 6.0 |
|  | H 10R | 0.8 | 1.4 | 2.0 |  |  |  |
|  | 5D | 0.8 | 1.4 | 2.0 |  |  |  |
| V | 10U 5R | 0.4 | 0.7 | 1.0 | 1.4 | 2.4 | 3.4 |
|  | 5U 20R | 0.3 | 0.5 | 0.7 |  |  |  |
|  | 5D 20R | 0.3 | 0.5 | 0.7 |  |  |  |
|  | 10D 5R | 0.4 | 0.7 | 1.0 |  |  |  |
| Maximum Luminous Intensity (cd)(5) |  |  |  |  | 18 | 20 | 25 |

1. Ratio requirements of 6.1.5.3 apply.
2. Multiple compartment lamp or multiple lamps requirements of 6.1.5.2 apply.
3. The measured value at each individual test point shall not be less than 60% of the required minimum value shown forth at individual test point location.
4. The sum of the luminous intensity measurements at each test point within a zone shall not be less than the Zone Total Luminous intensity shown according to the number of lighted sections.
5. The listed maximum shall not be exceeded over any area larger than that generated by a 0.5 degree radius within the solid angle defined by the test points.

TABLE 4

TURN SIGNAL LAMP PHOTOMETRIC PERFORMANCE REQUIREMENTS J1395

| Zone | Test Point Deg. | Zone Total Luminous Intensity, Candela, Yellow Front | Zone Total Luminous Intensity, Candela, Red Rear | Zone Total Luminous Intensity, Candela, Yellow Rear |
|---|---|---|---|---|
| 1 | 10U-5L | 130.0 | 50.0 | 84.0 |
|  | 5U-20L |  |  |  |
|  | 5D-20L |  |  |  |
|  | 10D-5L |  |  |  |
| 2 | 5U-10L | 250.0 | 100.0 | 165.0 |
|  | H-10L |  |  |  |
|  | 5D-10L |  |  |  |
| 3 | 5U-V | 950.0 | 380.0 | 610.0 |
|  | H-5L |  |  |  |
|  | H-V |  |  |  |
|  | H-5R |  |  |  |
|  | 5D-V |  |  |  |
| 4 | 5U-10R | 250.0 | 100.0 | 165.0 |
|  | H-10R |  |  |  |
|  | 5D-10R |  |  |  |

TABLE 4-continued

TURN SIGNAL LAMP PHOTOMETRIC PERFORMANCE REQUIREMENTS J1395

| Zone | Test Point Deg. | Zone Total Luminous Intensity, Candela, Yellow Front | Zone Total Luminous Intensity, Candela, Red Rear | Zone Total Luminous Intensity, Candela, Yellow Rear |
|---|---|---|---|---|
| 5 | 10U-5R<br>5U-20R<br>5D-20R<br>10D-5R | 130.0 | 50.0 | 84.0 |
| Maximum Luminous Intensity, Candela | | — | 300.0 | 750.0 |

1. The maximum luminous intensity shall not be exceeded over any area larger than that generated by a 0.5 degree radius within the area defined by the test point pattern of Table 2.
2. Unless otherwise specified, the lamp shall be considered to have failed the photometric requirements of this document if the luminous intensity at any test point is less than 60% of the values specified in Table 2.
3. Unless otherwise specified, the lamp shall be considered to have failed the photometric requirements of this document if the minimum luminous intensity between test points is less than 60% of the lower design values of Table 2 for the closest adjacent test points on a horizontal and vertical line as defined by the test point pattern.
4. The summation of the luminous intensity measurements at the specified test points in the zone shall be at least the values shown.
5. When a tail lamp, clearance lamp, or a parking lamp is combined with a turn signal lamp, see 6.1.5.2 of this document for luminous intensity ratio requirements.
6. Throughout the photometric pattern defined by the corner points of 20U-45L, 20U-45R, 10D-45R, and 10D-45L, the light intensity shall be not less than 0.4 candela in red or 1.0 candela in yellow for the rear turn signal lamp and 1.25 candela in yellow for the front turn signal lamp.

TABLE 5

TURN SIGNAL LAMP PHOTOMETRIC DESIGN GUIDELINES J1395

| Test Point Deg. | Luminous Intensity, Candela, Yellow Front | Luminous Intensity, Candela, Red Rear | Luminous Intensity, Candela, Yellow Rear |
|---|---|---|---|
| 10U-5L | 40.0 | 16.0 | 27.0 |
| 5R | 40.0 | 16.0 | 27.0 |
| 5U-20L | 25.0 | 10.0 | 15.0 |
| 10L | 75.0 | 30.0 | 50.0 |
| V | 175.0 | 70.0 | 110.0 |
| 10R | 75.0 | 30.0 | 50.0 |
| 20R | 25.0 | 10.0 | 15.0 |
| H-10L | 100.0 | 40.0 | 65.0 |
| 5L | 200.0 | 80.0 | 130.0 |
| V | 200.0 | 80.0 | 130.0 |
| 5R | 200.0 | 80.0 | 130.0 |
| 10R | 100.0 | 40.0 | 65.0 |
| 5D-20L | 25.0 | 10.0 | 15.0 |
| 10L | 75.0 | 30.0 | 50.0 |
| V | 175.0 | 70.0 | 110.0 |
| 10R | 75.0 | 30.0 | 50.0 |
| 20R | 25.0 | 10.0 | 15.0 |
| 10D-5L | 40.0 | 16.0 | 27.0 |
| 5R | 40.0 | 16.0 | 27.0 |
| Maximum Luminous Intensity, Candela | — | 300.0 | 750.0 |

1. The maximum luminous intensity shall not be exceeded over any area larger than that generated by a 0.25 degree radius within the area defined by the test point pattern of Table 2.
2. When a tail lamp, clearance lamp, or a parking lamp is combined with a turn signal lamp, see 6.1.5.2 of this document for luminous intensity ratio requirements.

TABLE 5-continued

TURN SIGNAL LAMP PHOTOMETRIC DESIGN GUIDELINES J1395

| Test Point Deg. | Luminous Intensity, Candela, Yellow Front | Luminous Intensity, Candela, Red Rear | Luminous Intensity, Candela, Yellow Rear |
|---|---|---|---|

3. Throughout the photometric pattern defined by the corner points of 20U-45L, 20U-45R, 10D-45R, and 10D-45L, the light intensity shall be not less than 0.4 candela in red or 1.0 candela in yellow for the rear turn signal lamps or 1.25 candela in yellow for the front turn signal lamp.

TABLE 6

CLEARANCE, SIDE MARKER, AND IDENTIFICATION LAMPS - PHOTOMETRIC REQUIREMENTS SAE J592

| Zone | Test Point[1,2] Deg. | Minimum Luminous Intensity (cd) See Notes[3,4] Red | Minimum Luminous Intensity (cd) See Notes[3,4] Yellow |
|---|---|---|---|
| 1 | 45L-10U<br>45L-H<br>45L-10D | 0.75 | 1.86 |
| 2 | V-10U<br>V-H<br>V-10D | 0.75 | 1.86 |
| 3 | 45R-10U<br>45R-H<br>45R-10D | 0.75 | 1.86 |

[1]Maximum luminous intensities of red clearance and identification lamps shall not exceed 18 cd within the solid cone angel 45L to 45R and 10U to 10D. When red clearance lamps are optically combined with stop or turn signal lamps, the maximum applies only on or above the horizontal. The maximum luminous intensity shall not be exceeded over any area larger than that generated by a 0.5 degree radius within the solid cone angle prescribed by the test points.
[2]The requirements for side markers used on vehicles less than 2032 mm wide need only be met for inboard test points at a distance of 4.6 m from the vehicle on a vertical plane that is perpendicular to the longitudinal axis of the vehicle and located midway between the front and rear side marker lamps.
[3]When calculating zone totals, the measured value at each test point shall not be less than 60% of the minimum values in Table 7.
[4]Combination Clearance and side marker lamps shall conform with both clearance and side marker photometric performance requirements.

TABLE 7

CLEARANCE, SIDE MARKER, AND IDENTIFICATION LAMPS - PHOTOMETRIC DESIGN GUIDELINES SAE J592

| Test Point (Degrees) | | Minimum Luminous Intensity (cd) See Notes[2] Red[1] | Minimum Luminous Intensity (cd) See Notes[2] Yellow |
|---|---|---|---|
| 10U | 45L | 0.25 | 0.62 |
|  | V | 0.25 | 0.62 |
|  | 45R | 0.25 | 0.62 |
| H | 45L | 0.25 | 0.62 |
|  | V | 0.25 | 0.62 |
|  | 45R | 0.25 | 0.62 |
| 10D | 45L | 0.25 | 0.62 |
|  | V | 0.25 | 0.62 |
|  | 45R | 0.25 | 0.62 |

[1]The maximum design value of a lamp intended for the rear of the vehicle should not be exceeded in the listed design maximum over any area larger than that generated by 0.25 degree radius within the solid angle defined by the test points in Table 7.
[2]For combined clearance and side marker lamps, both the clearance and side marker photometric design values should apply.

It should be noted however, that the corresponding SAE Standards that form part of FMVSS 108, 49 C.F.R. §571.108 (2000) may be earlier versions of J585, J1395, J1398, and J592e. The photometric requirements of these earlier versions are not set forth herein, However, SAE Standards J585, J1395, J1398, and J592e in their entirety, can be found at the Society of Automotive Engineers website. FMVSS 108, 49 C.F.R. §571.108 (2000) can be found at the National Highway Traffic Safety Administration website.

BRIEF DESCRIPTION OF THE DRAWINGS

FIG. 11 illustrates the distribution of light vertically and horizontally when the first embodiment of the stop/tail/turn/marker lamp is mounted on the back of a vehicle.

DETAILED DESCRIPTION

Figure 1:
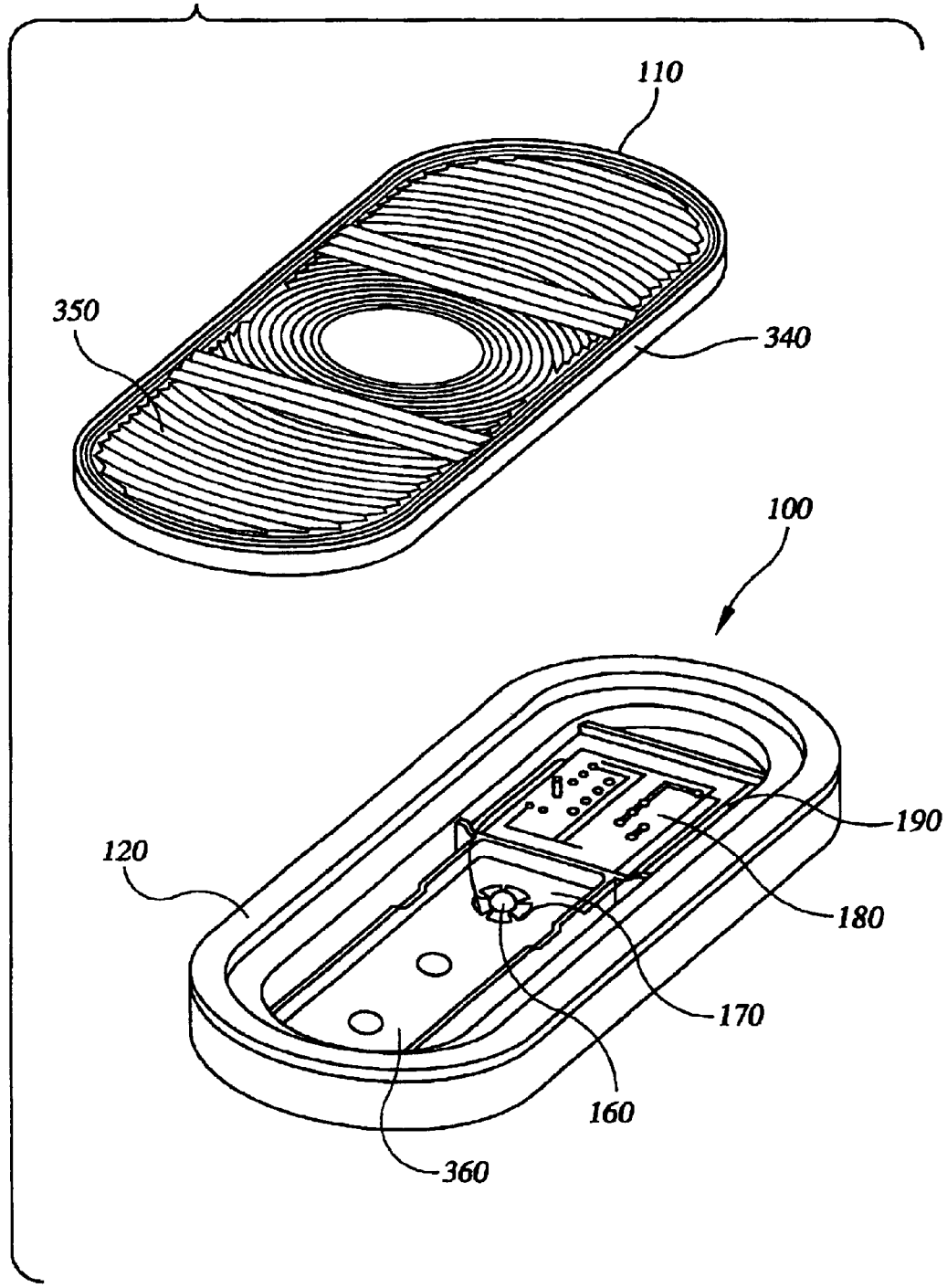
FIG. 1 is an exploded perspective view of a first embodiment of a single light emitting diode stop/tail/turn/marker vehicular lamp.

For the purpose of promoting an understanding of the present invention, references are made in the text hereof to embodiments of a stop/tail/turn/marker vehicular lamp, some of which are depicted in the drawings. It is nevertheless understood that no limitations to the scope of the invention are thereby intended. One of ordinary skill in the art will readily appreciate that modifications such as these involving the type of light emitting diode, number of light emitting diodes, geometry of the lamp, shape of the lens, and type and placement of optical elements of the lens, do not depart from the spirit and scope of the present invention. Some of these possible modifications are mentioned in the following description.

Moreover, the term "substantially" or "approximately" as used herein may be applied to modify any quantitative representation that could permissibly vary without resulting in a change in the basic function to which it is related. For example, a stop/tail/turn/marker lamp as disclosed herein as having a substantially oval shape might permissibly have a somewhat non-oval shape within the scope of the invention if its capability of functioning as a stop/tail/turn/marker lamp is not materially altered.

In the embodiments depicted, like reference numerals refer to identical structural elements in the various drawings.

FIG. 1 depicts an exploded perspective view of lamp 100, one embodiment of the present invention. In this embodiment, lamp 100 functions as a stop/tail/turn/marker lamp for a vehicle, such as a truck. Lamp 100 is shown to include housing 120, lens 110, circuit board 180, heat sink 360 and light emitting diode 160. Lens 110 has side wall 340 and front wall 350.

Figure 2:
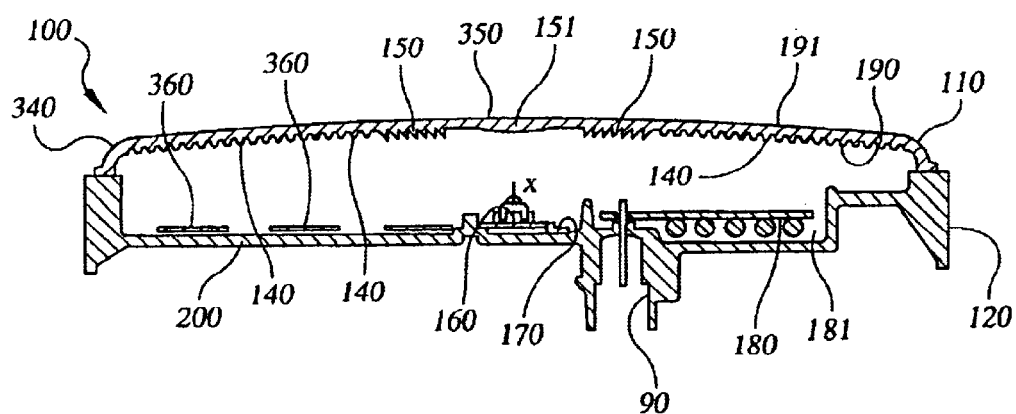
FIG. 2 is a cross section along the length of a first embodiment of a single light emitting diode stop/tail/turn/marker vehicular lamp.
Figure 3:
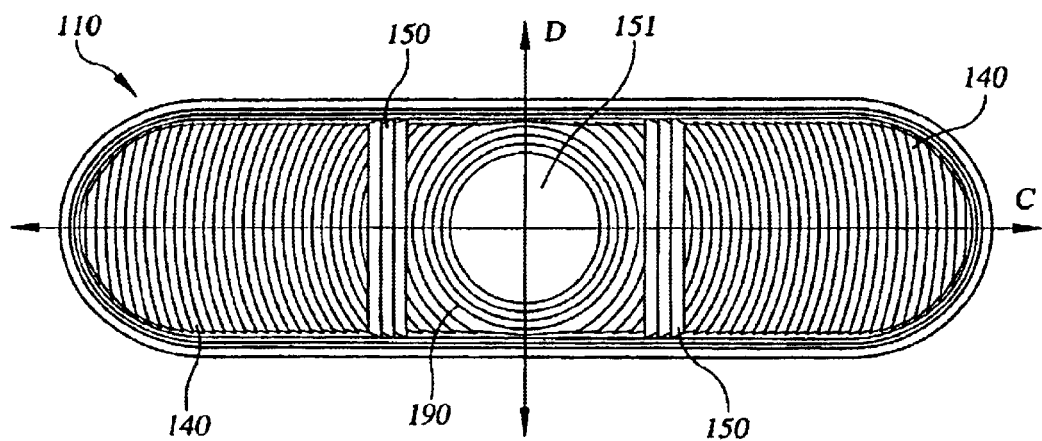
FIG. 3 is a top view of the rear surface of a lens for a first embodiment of a single light emitting diode stop/tail/turn/marker vehicular lamp.

FIG. 2 is a cross section of lamp 100 along longitudinal axis C (as shown in FIG. 3). Longitudinal axis C is defined as the longitudinal axis that divides lamp 100 into two equal parts along the length of lamp 100. As in FIG. 1, lamp 100 is shown to include housing 120, lens 110, circuit board 180, heat sink 360 and light emitting diode 160. Lens 110 is adapted to engage with housing 120. For example, side wall 340 can be hermetically sealed to housing 120 to protect lamp 100 against entry of dirt and contaminants. In an alternate embodiment, side wall 340 of lens 110 can be adapted to be removably secured to housing 120.

Front wall 350 of lens 110 has a rear surface 190 and a front surface 191, wherein rear surface 190 faces inward, toward light emitting diode 160 when lamp 100 is assembled, and front surface 191 faces outward, away from the vehicle surface when lamp 100 is mounted. Front surface 191 is a smooth surface, while rear surface 190 has integral lens elements for dispersing the incident light emitted from light emitting diode 160. Front wall 350 of lens 110 is a curved spherical wall, curving slightly outward in the middle section of lens 110, with a spherical radius of approximately 32 inches.

Lens 110 is a one-piece, transparent polycarbonate molding. To allow lamp 100 to function as a stop/tail/turn lamp, lens 110 is tinted red. In alternate embodiments, one could employ different colors of polycarbonate, such as amber or clear. Moreover, lens 110 could be made from other materials, such as glass. However, one of ordinary skill in the art should readily appreciate that, due to changes in the angle of refraction of glass, the angle and configuration of the optics will differ if glass is used as the material for lens 110 (rather than polycarbonate). In the embodiment shown here, housing 120 also is made from a polycarbonate material. One of ordinary skill in the art will readily appreciate, however, that other materials, including but not limited to acrylic, can be used for housing 120.

In the embodiments shown in FIGS. 1 and 2, heat sink 360 is adapted to secure to planar base 200 of housing 120 to dissipate excess heat away from light emitting diode 160. In this embodiment, heat sink 360 is made from steel. However, one of ordinary skill in the art will readily appreciate that heat sink 360 can be made of aluminum, or any other heat dissipating material. FIG. 2 further illustrates power input module 90 molded in base 200 of housing 120 and adapted to connect lamp 100 into the electrical system of a vehicle. As shown in FIGS. 1 and 2, first potting cavity 170 is formed in housing 120 around light emitting diode 160 and heat sink 360. In addition, second potting cavity 181 is formed in housing 120 around circuit board 180. Lamp 100 is adapted to be mounted to a vehicle either horizontally or vertically with a grommet (not shown) and, therefore, no flange is present in the embodiment shown in FIGS. 1 and 2.

Referring to FIGS. 1 and 2, a single light emitting diode 160 is adapted to secure to base 200 of housing 120 as a light source. In this embodiment, light emitting diode 160 is disposed such that the optical axis X of light emitting diode 160 is normal to the plane of lens front wall 350. Moreover, light emitting diode 160 is adapted to contact heat sink 360. Light emitting diode 160 is a high-flux light emitting diode. As used herein, a high-flux light emitting diode is defined as a light emitting diode capable of emitting a minimum flux of approximately 20 Lumens. In this embodiment, light emitting diode 160 is a Lambertian source with a minimum flux of approximately 20 Lumens. As a Lambertian source, the radiation pattern generated by light emitting diode 160 is emitted at an included angle slightly great than 180 degrees. More specifically, in the embodiment shown in FIGS. 1 and 2, a red Luxeon™ Lambertian-style light emitting diode manufactured by LumiLeds, capable of producing a flux of approximately 20 to 55 Lumens, is used. One of ordinary skill in the art will readily appreciate, however, that other light emitting diodes capable of emitting a minimum flux of approximately 20 Lumens can be used as a light source. Moreover, a high-flux light emitting diode with a "bat-wing" radiation pattern or a "side-firing" light emitting diode can be used.

To provide power to light emitting diode 160, circuit board 180 is secured to planar base 200. Circuit board 180 is a printed circuit board having two isolation diode rectifiers and has resistors to maintain the proper current through light emitting diode 160 at an input voltage of 13.5 Volts, which is desirable. One of ordinary skill in the art will readily appreciate, however, that other mechanisms for providing power to the light emitting diodes can be used. For example, in another embodiment of the invention (not shown), a circuit board having three terminal adjustable regulators to regulate current through the high-flux light emitting diode can be used to achieve an input voltage of 13.5 Volts. In addition, a switching power supply method can be employed.

FIG. 3 depicts a top view of rear surface 190 of lens 110. Referring to FIGS. 1 and 3, lens 110 and housing 120 are substantially oval to comprise one type of stop/tail/turn/marker vehicular lamp. In another embodiment (not shown), lens 110 and housing 120 are substantially circular to comprise a second type of vehicular lamp. One of ordinary skill in the art will readily appreciate that other housing and lens shapes can be utilized to constitute other varieties of vehicular lamps, such as those suitable as clearance and marker lamps, without departing from the scope and spirit of the present invention.

In FIG. 3, lens front wall 350 is shown to have a plurality of prism rings 140 integrally formed on rear surface 190. Additionally, front wall 350 has linear prism optics 150 and aspheric center lens 151 integrally formed on rear surface 190. As further shown in FIG. 3, the plurality of prism rings 140, linear prism optics 150 and aspheric center lens 151 collectively cover the entire front wall 350 of lens 110. In this embodiment, when lens 110 is engaged with housing 120, center lens 151 is disposed directly opposite light emitting diode 160. The combination of prism rings 140, linear prism optics 150 and aspheric center lens 151 allow lamp 100 to satisfy the photometric requirements of Standards J585, J1395, J1398 and J592, as referenced herein, when lamp 100 is mounted horizontally or vertically on a vehicle.

Prism rings 140 are a plurality of concentric rings progressing outwardly from center lens 151. In this embodiment, there are approximately thirty-five (35) individual concentric prism rings 140. Prism rings 140 are structured as catadioptric prisms. As used herein, a catadioptric prism is an optical lens element that disperses light by both refraction and reflection.

Figure 4:
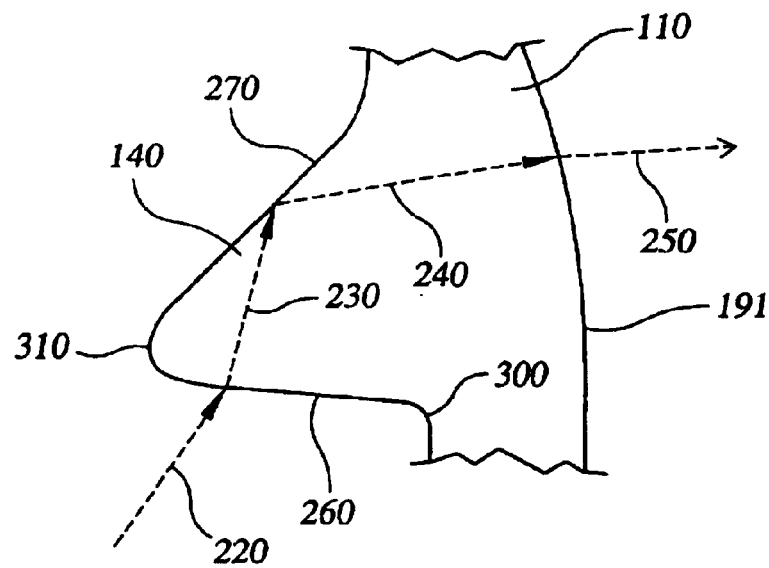
FIG. 4 is an enlarged cross sectional view of an individual prism ring that illustrates the manner in which light emitted from a light emitting diode is directed by a catadioptric prism.

FIG. 4 is an enlarged view of a cross section of an individual prism ring 140, which, as mentioned above, is structured as a catadioptric prism. Each individual prism ring 140 has a tip 310, inside edge 260, outside edge 270, and well 300. In this embodiment, tips 310 have a narrow curvature with a cross-sectional radius ranging from approximately 0.005 to 0.010 inches. Light emitted from light emitting diode 160 and impinging on inside edge 260 and outside edge 270 produce a catadioptric effect, given the surface design of edges 260 and 270, as shown in FIG. 4. The surfaces of outside edge 270 and inside edge 260, as well as tips 310, were designed for desired light distribution functions using the modeling programs described infra. Additionally, the specific geometry of the prism rings 140 is discussed in detail infra.

With further reference to FIG. 4, the catadioptric effect is achieved when light ray 220, emitted from light emitting diode 160, impinges prism ring 140 at inside edge 260 and is thereby refracted toward outside edge 270, resulting in refracted light ray 230; refracted light ray 230, traveling through prism ring 140, then impinges on outside edge 270 and is reflected, resulting in reflected light ray 240; light ray 240 is then transmitted through lens 110 and is refracted at front surface 191, resulting in output light ray 250. One of ordinary skill in the art will readily appreciate that the curvature and angle of edges 260 and 270 can be varied using the modeling programs described infra to produce the precise horizontal and vertical light distribution pattern desired.

Figure 5:
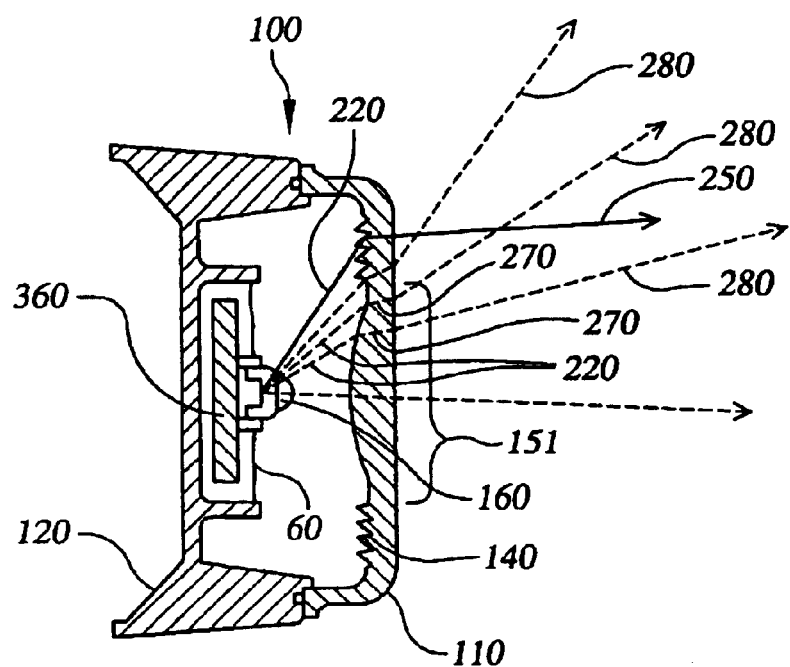
FIG. 5 is a cross section along the width of a first embodiment of a single light emitting diode stop/tail/turn/marker lamp that illustrates the manner in which light emitted from a light emitting diode is distributed by the lens.

FIG. 5 is a cross section along vertical axis D (as shown in FIG. 3) of lamp 100. Vertical axis D is defined as the vertical axis that divides lamp 100 into two equal parts along the width of lamp 100. FIG. 5 depicts the manner in which light emitted from light emitting diode 160 is distributed by lens 110. As shown here, center lens 151 is structured as a "Through Optic". As used herein, a "Through Optic" is an optical lens element that disperses light by refraction only. More specifically, the "Through Optic" effect is achieved by center lens 151 in the following manner: when light ray 220 emitted from light emitting diode 160 impinges on the surface of center lens 151, the surface of center optic 151 refracts light rays 220 through lens 110 as light ray 270 to form light rays 280. Center lens 151 produces a smooth distribution out to approximately 10 degrees. Linear prism optics 150 (not shown here) aim the light left and right of center for vertically mounted lamps. As described above and shown in FIG. 4, prism rings 140 are structured as catadioptric prisms that disperse light ray 220 emitted by light emitting diode 160 by both refraction and reflection, resulting in output light ray 250.

Prism rings 140, center lens 151 and linear prism optics 150 disperse the light emitted from light emitting diode 160 vertically and horizontally. More specifically, prism rings 140 reflect and refract the incident light so that the output beam has an angulation of approximately 0 degrees to +/−25 degrees. Linear prism optics 150 reflect and refract the incident light so that the output beam has an angulation of approximately 0 degrees to +/−15 degrees. Additionally, aspheric center lens 151 refracts the incident light to produce an output beam with a smooth angulation of approximately 0 to +/−10 degrees. The resultant individual output beams combine to form a composite light distribution that satisfies the photometric requirements of SAE Standards J585, J1395, J1398 and J592, as referenced herein, when lamp 100 is mounted horizontally or vertically on a vehicle.

In general, according to the SAE standards, the composite light distribution is required to have a minimum beam angulation of at least 10° above and below longitudinal axis C (in the vertical plane). In the horizontal plane, the composite light distribution is required to have a minimum angulation of at least 20° left and right of vertical axis D to satisfy the stop, turn and tail lamp standards, and a minimum angulation of at least 45° left and right of the vertical axis D to satisfy the marker lamp standards. The specific luminous intensities required by the SAE standards at points in space are provided in Tables 1–7 set forth above.

As shown in FIG. 5, light emitting diode 160 and heat sink 360 may be potted with epoxy. One of ordinary skill in the art will readily appreciate that other potting materials, including but not limited to, urethane or silicone, can be used. As further shown in FIG. 5, the epoxy may not exceed line 60. One of ordinary skill in the art will readily appreciate, however, that if lamp 100 is not potted, first potting cavity 170 and second potting cavity 181 are not necessary.

Figure 6:
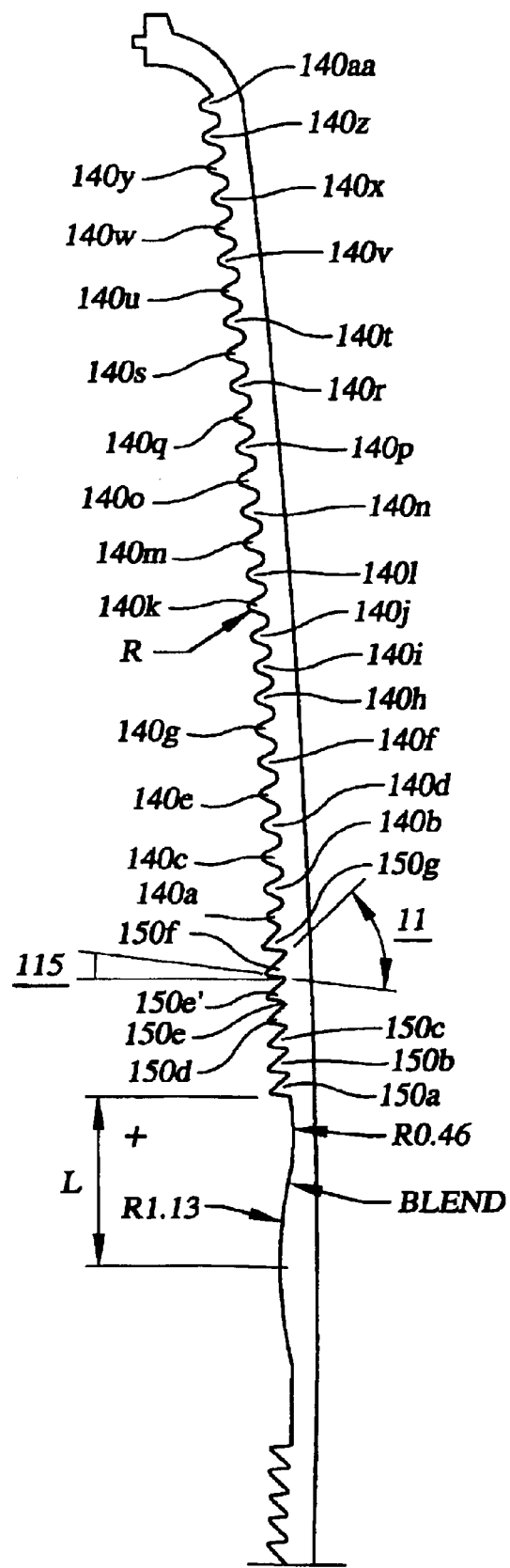
FIG. 6 is a partial cross section along the longitudinal axis of the lens in a first embodiment.

FIG. 6 is a partial cross section of lens 110 along longitudinal axis C. With reference to FIG. 6, the specific geometries of linear prism optics 150*a*–150*g* and each prism ring 140*a*–140*aa* can be found in Table 8 set forth below. As further shown in FIG. 6, the convex portion of center lens 151 has a radius of 1.13 inches and the concave portion of center lens 151 has a radius of 0.46 inches.

TABLE 8

| OPTIC | Distance from Center (L) (inches) | ANGLE E (degrees) | ANGLE F (degrees) | RADIUS OF CURVATURE (R) (inches) | TYPE |
|---|---|---|---|---|---|
| 150a | 0.52 | 5 | 40 | NONE | RING |
| 150b | 0.6 | 5 | 39.8 | NONE | RING |
| 150c | 0.68 | 5 | 42.3 | NONE | RING |
| 150d | 0.76 | 5 | 41.7 | NONE | RING |
| 150e | .084 | 5 | 42.4 | NONE | RING |
| 150e' | 0.86 | 25 | 62.2 | NONE | LINEAR |
| 150f | 0.95 | 5 | 42.5 | NONE | LINEAR |
| 150g | 1.04 | 5 | 43 | NONE | LINEAR |
| 140a | 1.11 | 23 | 54.6 | NONE | RING |
| 140b | 1.17 | 22.6 | 54.5 | 0.5 | RING |
| 140c | 1.24 | 22.5 | 54.7 | 0.5 | RING |
| 140d | 1.31 | 22 | 54.1 | 0.43 | RING |
| 140e | 1.37 | 21.5 | 53.1 | 0.36 | RING |
| 140f | 1.44 | 20.1 | 52.3 | 0.36 | RING |
| 140g | 1.51 | 20.4 | 52.3 | 0.36 | RING |
| 140h | 1.58 | 20.18 | 50 | 0.35 | RING |
| 140i | 1.65 | 19.5 | 49 | 0.35 | RING |
| 140j | 1.71 | 19.3 | 49 | 0.5 | RING |
| 140k | 1.78 | 18.7 | 49 | 0.44 | RING |
| 140l | 1.85 | 18 | 48 | 0.46 | RING |
| 140m | 1.92 | 17.6 | 47.6 | 0.46 | RING |
| 140n | 1.99 | 17 | 46.2 | 0.34 | RING |
| 140o | 2.06 | 16.5 | 46 | 0.41 | RING |
| 140p | 2.13 | 16.2 | 45.4 | 0.37 | RING |
| 140q | 2.20 | 15.5 | 44 | 0.31 | RING |
| 140r | 2.27 | 15 | 43.4 | 0.31 | RING |
| 140s | 2.34 | 14.7 | 43 | 0.31 | RING |
| 140t | 2.41 | 14.23 | 42.5 | 0.31 | RING |
| 140u | 2.49 | 13.6 | 42.3 | 0.26 | RING |
| 140v | 2.56 | 13 | 39.5 | 0.25 | RING |
| 140w | 2.63 | 12.5 | 39.3 | 0.24 | RING |
| 140x | 2.70 | 12 | 38.7 | 0.24 | RING |
| 140y | 2.77 | 11.7 | 38.7 | 0.24 | RING |
| 140z | 2.84 | 11 | 38.9 | 0.24 | RING |
| 140aa | 2.91 | 11 | 44.4 | 0.24 | RING |

Figure 7:
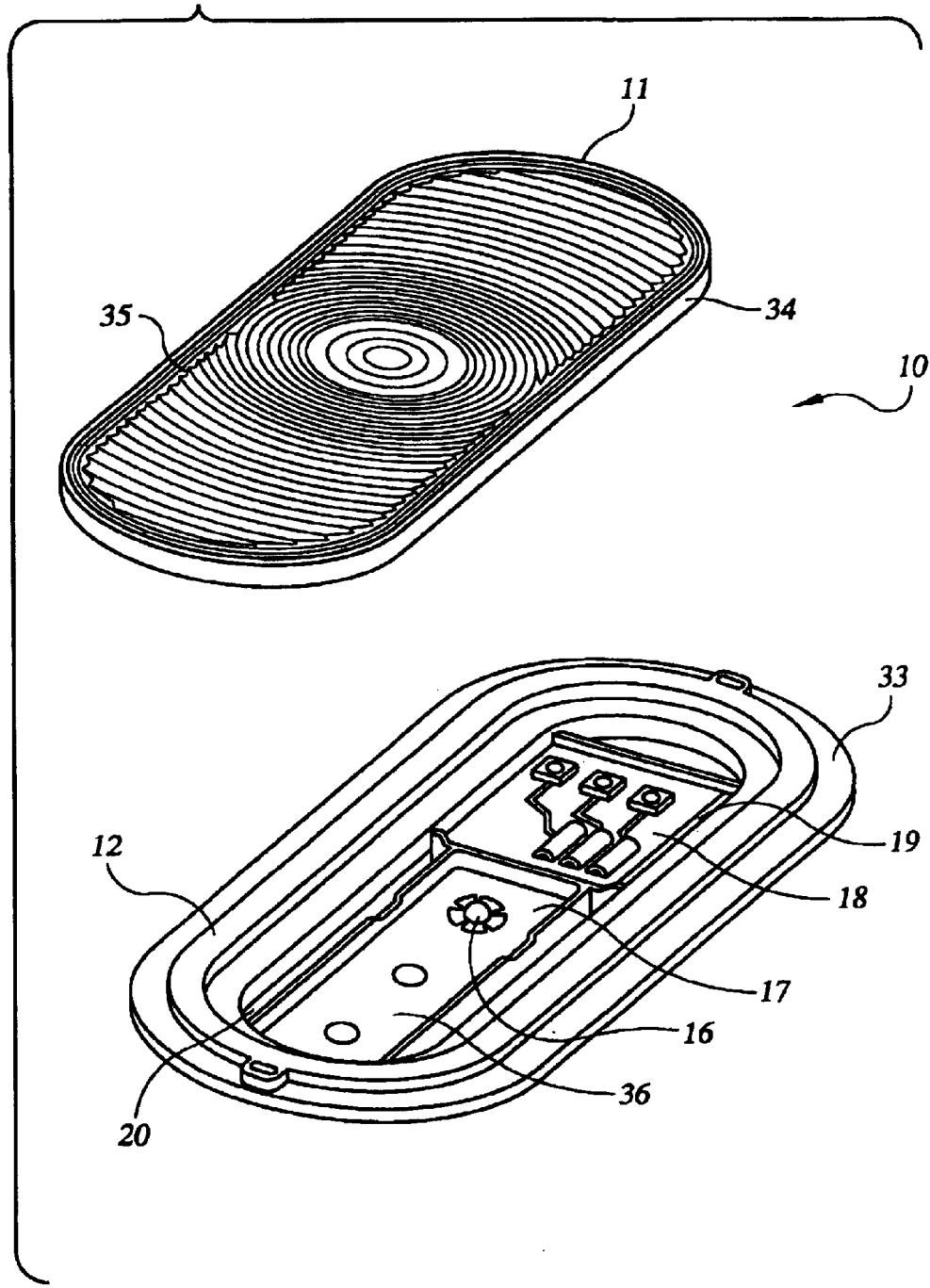
FIG. 7 is an exploded perspective view of a second embodiment of a single light emitting diode stop/tail/turn/marker vehicular lamp.

FIG. 7 illustrates an exploded perspective view of an alternate embodiment of the present invention, stop/tail// turn/marker lamp 10. Similar to lamp 100 disclosed in FIGS. 1–4, lamp 10 is shown to include housing 12, lens 11, circuit board 18, heat sink 36 and light emitting diode 16. In this embodiment, housing 12 has a planar base 20 and flange 33. Lens 11, comprising side wall 34 and front wall 35, is adapted to engage with housing 12, as described above.

Figure 8:
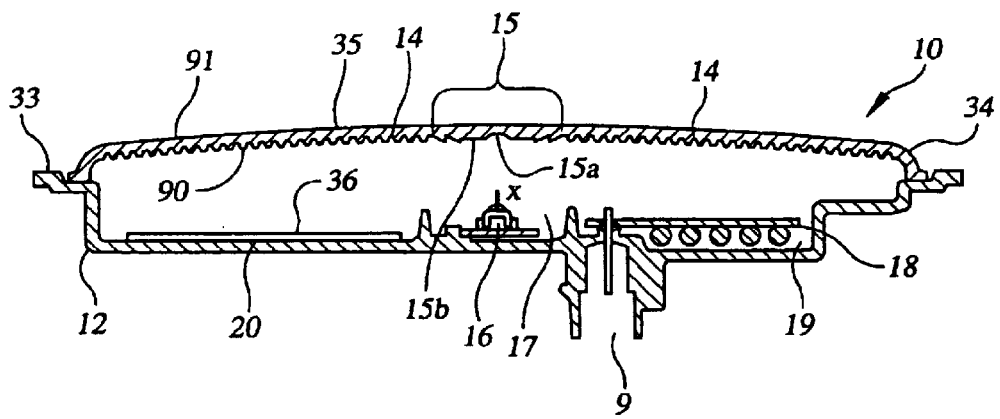
FIG. 8 is a cross section along the length of a second embodiment of a single light emitting diode stop/tail/turn/marker vehicular lamp.
Figure 9:
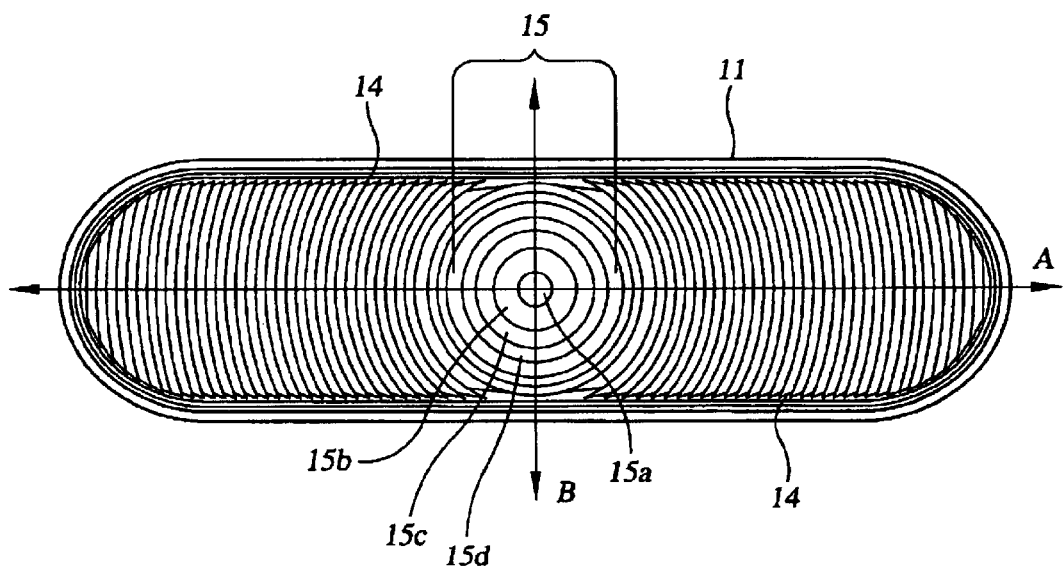
FIG. 9 is a top view of the rear surface of a lens for a second embodiment of a single light emitting diode stop/tail/turn/marker vehicular lamp.

FIG. 8 is a cross section along longitudinal axis A (as shown in FIG. 9) of lamp 10. Longitudinal axis A is defined as the longitudinal axis that divides lamp 10 into two equal parts along the length of lamp 10. As in FIG. 6, lamp 10 is shown to include housing 12, lens 11, circuit board 18, heat sink 36 and one light emitting diode 16. Housing 12 has a planar base 20. In lamp 10, heat sink 36 is secured to planar base 20.

Lens 11 is a one-piece, transparent polycarbonate molding. Like front wall 350 of lens 110, front wall 35 of lens 11 has a rear surface 90 and a front surface 91, wherein rear surface 90 faces inward, toward light emitting diode 16 when lamp 10 is assembled, and front surface 91 faces outward, away from the vehicle surface when lamp 10 is mounted. Front surface 91 is a smooth surface, while rear surface 90 has integral lens elements for dispersing the incident light emitted from light emitting diode 16. Front wall 35 of lens 11 is a curved spherical wall, curving slightly outward in the middle section of lens 11, with a spherical radius of approximately 32 inches.

As in the embodiment illustrated in FIGS. 1–4, first potting cavity 17 is formed in housing 12 around light emitting diode 16 and heat sink 36, and second potting cavity 19 is formed in housing 12 around circuit board 18. As illustrated in FIG. 6, lens 11 and housing 12 are substantially oval. Lamp 10 is adapted to be mounted on a vehicle with flange 33 either horizontally or vertically. In the embodiment shown here, a red transparent polycarbonate material is used for lens 11 and a polycarbonate material is used for housing 12. Circuit board 18 is secured to base 20 to provide power to light emitting diode 16.

Referring to FIGS. 7 and 8, a single light emitting diode 16 is secured to base 20 as a light source. Light emitting diode 16 is disposed such that the optical axis X of light emitting diode 16 is normal to the plane of lens front wall 35. As in the previous embodiment, light emitting diode 16 is a high-flux light emitting diode, capable of emitting a light beam with a substantially Lambertian radiation pattern and a minimum flux of approximately 20 Lumens. More specifically, light emitting diode 16 is a red Luxeon™ Lambertian style light emitting diode manufactured by LumiLeds. As discussed above, one of ordinary skill in the art will readily appreciate, however, that other light emitting diodes with a minimum flux of 20 Lumens can be used as a light source. Moreover, one of ordinary skill in the art will readily appreciate that instead of a single light emitting diode, a small number of light emitting diodes can be used without varying from the scope of the invention. For example, the required flux can be achieved by using two or three light emitting diodes.

FIG. 9 depicts a top view of rear surface 90 of lens 11. In FIG. 9, lens front wall 35 is shown to have a plurality of prism rings 14 integrally formed on rear surface 90. Prism rings 14 are concentric rings integrally formed on rear surface 90 of lens 11. In this embodiment, there are approximately thirty-seven (37) individual concentric prism rings 14. Additionally, front wall 35 is shown to have a substantially circular center optic 15 integrally formed on rear surface 90. The plurality of prism rings 14 and center optic 15 collectively cover the entire front wall 35 of lens 11. The combination of prism rings 14 and center optic 15 allow lamp 10 to satisfy the photometric requirements of Standards J585, J1395, J1398 and J592, as referenced herein, when lamp 10 is mounted horizontally on a vehicle.

Referring to FIGS. 8 and 9, center optic 15 comprises a substantially circular, convex portion 15a and a substantially planar, annular portion 15b. Center optic 15 also comprises two concentric rings 15c and 15d progressing outwardly from annular portion 15b. In this embodiment, when lens 11 is engaged with housing 12, convex portion 15a is disposed directly opposite light emitting diode 16. Center optic 15 is structured as a "Through Optic". As discussed above, a "Through Optic" is an optical lens element that disperses light by refraction only.

Figure 10:
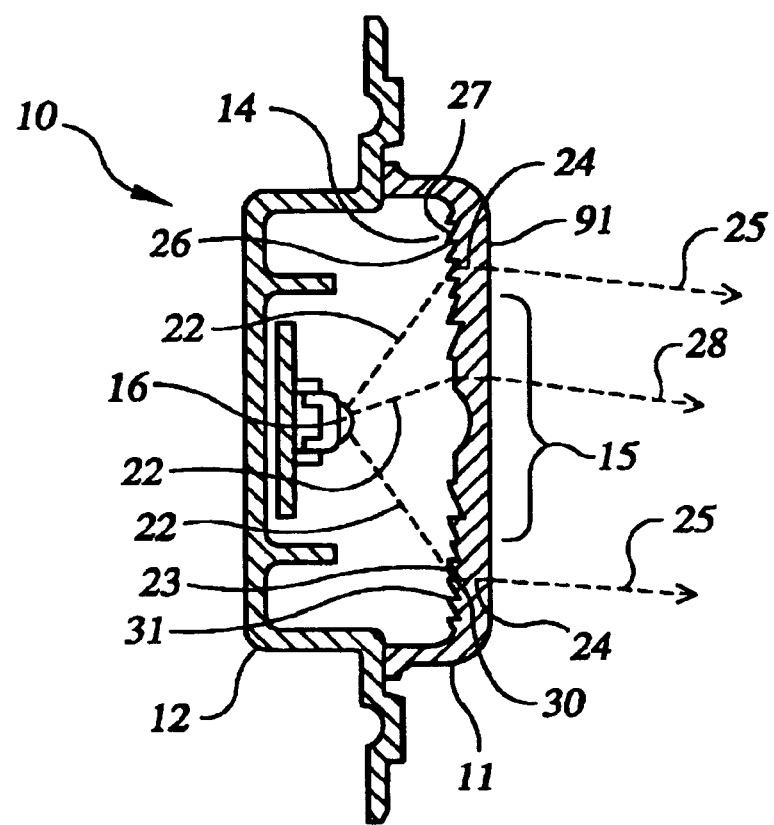
FIG. 10 is a cross section along the width of a second embodiment of a single light emitting diode stop/tail/turn/marker lamp.

FIG. 10 is a cross section along vertical axis B (as shown in FIG. 9) of lamp 10. Vertical axis B is defined as the vertical axis that divides lamp 10 into two equal parts along the width of lamp 10. FIG. 10 illustrates the manner in which light emitted from light emitting diode 16 is distributed by prism rings 14. Prism rings 14 are structured as catadioptric prisms and disperse the light emitted from light emitting diode 16 vertically and horizontally in varying intensities. Like prism rings 140 discussed supra, each individual prism ring 14 has a tip 31 and well 30. FIG. 10 further depicts inside edge 26 and outside edge 27, which together produce a catadioptric effect. More specifically, the catadioptric effect is achieved when light ray 22, emitted from light emitting diode 16, impinges prism ring 14 at inside edge 26 and is thereby refracted toward outside edge 27, resulting in refracted light ray 23; refracted light ray 23, traveling through prism ring 14, then impinges on outside edge 27 and is reflected, resulting in reflected light ray 24; light ray 24 is then transmitted through lens 11 and is refracted at front surface 91, resulting in output light ray 25.

As shown here, center optic 15 produces a "Through Optic" effect, which is characterized by a distribution of light by refraction alone. More specifically, the "Through Optic" effect is achieved by center optic 15 in the following manner: when light ray 22 emitted from light emitting diode 16 impinges on the surface of center optic 15, the surface of center optic 15 refracts light rays 22 through lens 11 as light ray 22 to form light rays 28.

Prism rings 14 and center optic 15 disperse the light emitted from light emitting diode 16 vertically and horizontally. More specifically, prism rings 14 reflect and refract the incident light so that the output beam has an angulation of approximately 0 degrees to +/−25 degrees. Additionally, center optic 15 refracts the incident light so that the output beam has an angulation of approximately 0 degrees to +/−17 degrees. The resultant individual output beams combine to form a composite light distribution that satisfies the photometric requirements of SAE Standards J585, J1395, J1398 and J592, as referenced herein, when lamp 10 is mounted horizontally on a vehicle.

FIG. 11 is a rear end view of vehicle 50 that illustrates how light is distributed vertically and horizontally when lamp 100 is mounted horizontally on the back of vehicle 50 and used as a marker lamp. Specifically, FIG. 11 illustrates the resulting light distribution above and below horizontal axis C of lamp 100. FIG. 11 also illustrates the resulting light distribution along horizontal axis C of lamp 100 at an angle that is 45 degrees to the left and right of vertical axis D. Referring to FIG. 11, the distribution pattern generated by the lens elements allow lamp 100 to perform the marker function pursuant to SAE standards. The light distribution pattern shown in FIG. 11 would be similar when used as a stop lamp. Test analysis for lamp 100, mounted both horizontally and vertically, are included as Tables 9–12. These test results show that lamp 100 satisfies the SAE requirements for the stop and tail functions when mounted either horizontally or vertically.

TABLE 9

Stop Function in Horizontal Position

| Area | Result | Value | Min | SPEC-Min | Max | SPEC-Max |
|---|---|---|---|---|---|---|
| "10U-5L" | "Pass" | 37.994 | 37.994 | 16.00 | 37.994 | 300.000 |
| "10U-5R" | "Pass" | 42.640 | 42.640 | 16.000 | 42.640 | 300.000 |
| "10D-5L" | "Pass" | 47.973 | 47.973 | 16.000 | 47.973 | 300.000 |
| "10D-5R" | "Pass" | 42.577 | 42.577 | 16.000 | 42.577 | 300.000 |
| "5U-20L" | "Pass" | 30.554 | 30.554 | 10.000 | 30.554 | 300.000 |
| "5U-20R" | "Pass" | 29.241 | 29.241 | 10.000 | 29.241 | 300.000 |
| "5D-20L" | "Pass" | 31.352 | 31.352 | 10.000 | 31.352 | 300.000 |
| "5D-20R" | "Pass" | 26.806 | 26.806 | 10.000 | 26.806 | 300.000 |
| "5U-10L" | "Pass" | 39.811 | 39.811 | 30.000 | 39.811 | 300.000 |
| "5U-10R" | "Pass" | 39.144 | 39.144 | 30.000 | 39.144 | 300.000 |
| "5D-10L" | "Pass" | 37.921 | 37.921 | 30.000 | 37.921 | 300.000 |
| "5D-10R" | "Pass" | 40.140 | 40.140 | 30.000 | 40.140 | 300.000 |
| "5U-V" | "Pass" | 95.497 | 95.497 | 70.000 | 95.497 | 300.000 |
| "5D-V" | "Pass" | 97.002 | 97.002 | 70.000 | 97.002 | 300.000 |
| "H-10L" | "Pass" | 60.383 | 60.383 | 40.000 | 60.383 | 300.000 |
| "H-10R" | "Pass" | 64.396 | 64.396 | 40.000 | 64.396 | 300.000 |
| "H-5L" | "Pass" | 86.810 | 86.810 | 80.000 | 86.810 | 300.000 |
| "H-5R" | "Pass" | 86.450 | 86.450 | 80.000 | 86.450 | 300.000 |
| "H-V" | "Pass" | 198.912 | 198.912 | 80.000 | 198.912 | 300.000 |

TABLE 10

Stop Function in Vertical Position

| Area | Result | Value | Min | SPEC-Min | Max | SPEC Max |
|---|---|---|---|---|---|---|
| "10U-5L" | "Pass" | 50.706 | 50.706 | 16.000 | 50.706 | 300.000 |
| "10U-5R" | "Pass" | 44.654 | 44.654 | 16.000 | 44.654 | 300.000 |
| "10D-5L" | "Pass" | 46.019 | 46.019 | 16.000 | 46.019 | 300.000 |
| "10D-5R" | "Pass" | 52.799 | 52.799 | 16.000 | 52.799 | 300.000 |
| "5U-20L" | "Pass" | 33.761 | 33.761 | 10.000 | 33.761 | 300.000 |
| "5U-20R" | "Pass" | 32.331 | 32.331 | 10.000 | 32.331 | 300.000 |
| "5D-20L" | "Pass" | 29.836 | 29.836 | 10.000 | 29.836 | 300.000 |
| "5D-20R" | "Pass" | 35.501 | 35.501 | 10.000 | 35.501 | 300.000 |
| "5U-10L" | "Pass" | 46.217 | 46.217 | 30.000 | 46.217 | 300.000 |
| "5U-10R" | "Pass" | 46.632 | 46.632 | 30.000 | 46.632 | 300.000 |
| "5D-10L" | "Pass" | 44.529 | 44.529 | 30.000 | 44.529 | 300.000 |
| "5D-10R" | "Pass" | 42.832 | 42.832 | 30.000 | 42.832 | 300.000 |
| "5U-V" | "Pass" | 113.438 | 113.438 | 70.000 | 113.438 | 300.000 |
| "5D-V" | "Pass" | 106.337 | 106.337 | 70.000 | 106.337 | 300.000 |
| "H-10L" | "Pass" | 73.817 | 73.817 | 40.000 | 73.817 | 300.000 |
| "H-10R" | "Pass" | 65.972 | 65.972 | 40.000 | 65.972 | 300.000 |
| "H-5L" | "Pass" | 88.375 | 88.375 | 80.000 | 88.375 | 300.000 |
| "H-5R" | "Pass" | 100.567 | 100.567 | 80.000 | 100.567 | 300.000 |
| "H-V" | "Pass" | 222.313 | 222.313 | 80.000 | 222.313 | 300.000 |

TABLE 11

Tail Function in Horizontal Position

| Area | Result | Value | Min | SPEC-Min | Max | SPEC-Max |
|---|---|---|---|---|---|---|
| "10U-5L" | "Pass" | 3.972 | 3.972 | 0.400 | 3.972 | |
| "10U-5R" | "Pass" | 3.732 | 3.732 | 0.400 | 3.732 | |
| "10D-5L" | "Pass" | 3.569 | 3.569 | 0.400 | 3.569 | |
| "10D-5R" | "Pass" | 3.707 | 3.707 | 0.400 | 3.707 | |
| "5U-20L" | "Pass" | 2.262 | 2.262 | 0.300 | 2.262 | |
| "5U-20R" | "Pass" | 2.997 | 2.997 | 0.300 | 2.997 | |

TABLE 11-continued

Tail Function in Horizontal Position

| Area | Result | Value | Min | SPEC-Min | Max | SPEC-Max |
|---|---|---|---|---|---|---|
| "5U-20L" | "Pass" | 2.959 | 2.959 | 0.300 | 2.959 |  |
| "5D-20R" | "Pass" | 2.586 | 2.586 | 0.300 | 2.586 |  |
| "5U-10L" | "Pass" | 3.598 | 3.598 | 0.800 | 3.598 |  |
| "5U-10R" | "Pass" | 4.490 | 4.490 | 0.800 | 4.490 |  |
| "5D-10L" | "Pass" | 3.961 | 3.961 | 0.800 | 3.961 |  |
| "5D-10R" | "Pass" | 3.826 | 3.826 | 0.800 | 3.826 |  |
| "5U-V" | "Pass" | 8.303 | 8.303 | 1.800 | 8.303 |  |
| "5D-V" | "Pass" | 7.083 | 7.083 | 1.800 | 7.083 |  |
| "H-10L" | "Pass" | 4.907 | 4.907 | 0.800 | 4.907 |  |
| "H-10R" | "Pass" | 5.873 | 5.873 | 0.800 | 5.873 |  |
| "H-5L" | "Pass" | 8.940 | 8.940 | 2.000 | 8.940 |  |
| "H-5R" | "Pass" | 9.238 | 9.238 | 2.000 | 9.238 |  |
| "H-V" | "Pass" | 17.744 | 17.744 | 2.000 | 17.744 |  |

TABLE 12

Tail Function in Vertical Position

| Area | Result | Value | Min | SPEC-Min | Max | SPEC Max |
|---|---|---|---|---|---|---|
| "10U-5L" | "Pass" | 3.499 | 3.499 | 0.400 | 3.499 |  |
| "10U-5R" | "Pass" | 3.927 | 3.927 | 0.400 | 3.927 |  |
| "10D-5L" | "Pass" | 4.419 | 4.419 | 0.400 | 4.419 |  |
| "10D-5R" | "Pass" | 3.922 | 3.922 | 0.400 | 3.922 |  |
| "5U-20L" | "Pass" | 2.814 | 2.814 | 0.300 | 2.814 |  |
| "5U-20R" | "Pass" | 2.693 | 2.693 | 0.300 | 2.693 |  |
| "5D-20L" | "Pass" | 2.888 | 2.888 | 0.300 | 2.888 |  |
| "5D-20R" | "Pass" | 2.469 | 2.469 | 0.300 | 2.469 |  |
| "5U-10L" | "Pass" | 3.667 | 3.667 | 0.800 | 3.667 |  |
| "5U-10R" | "Pass" | 3.605 | 3.605 | 0.800 | 3.605 |  |
| "5D-10L" | "Pass" | 3.493 | 3.493 | 0.800 | 3.493 |  |
| "5D-10R" | "Pass" | 3.697 | 3.697 | 0.800 | 3.697 |  |
| "5U-V" | "Pass" | 8.796 | 8.796 | 1.800 | 8.796 |  |
| "5D-V" | "Pass" | 8.934 | 8.934 | 1.800 | 8.934 |  |
| "H-10L" | "Pass" | 5.562 | 5.562 | 0.800 | 5.562 |  |
| "H-10R" | "Pass" | 5.931 | 5.931 | 0.800 | 5.931 |  |
| "H-5L" | "Pass" | 7.996 | 7.996 | 2.000 | 7.996 |  |
| "H-5R" | "Pass" | 7.962 | 7.962 | 2.000 | 7.962 |  |
| "H-V" | "Pass" | 18.321 | 18.321 | 2.000 | 18.321 |  |

One of ordinary skill in the art will readily appreciate that external (rather than internal) prism rings on the front surface of a lens may be used to distribute the light emitted from the high-flux light emitting diode. In addition, one of ordinary skill in the art will also readily appreciate that reflectors, or different lens optics (other than prism rings or linear optics), can be employed to distribute the light emitted from the high-flux light emitting diode. For example, parabolic reflectors in combination with internal, lens pillow optics or segmented reflectors (without lens optics) can also be employed to distribute the incident light emitted from the light emitting diode. More specifically, in one embodiment (not shown), prism ring optics in the internal region of the lens, and in combination with external pillow optics, will distribute the light emitted from a light emitting diode, both horizontally and vertically. These pillow optics are arranged in a rectangular plan form, the length and the width of which determines the amount of spread in the vertical and horizontal planes. Additionally, the contour of the pillow optics may be spherical, convex, concave, or toroidal. One of ordinary skill in the art will further appreciate that, depending on the nature of the light emitting diode's incident light beam, different types of lens optics or reflectors used to distribute the light emitted will vary.

In alternative embodiments, light emitting diode 16 and circuit board 18 (or light emitting diode 160 and circuit board 180) comprise a removable single-unit module that can be inserted inside the housing of a variety of lamps. This provides a simple and convenient way to replace a light emitting diode unit within a given housing.

For each of the embodiments disclosed herein, the surfaces for lens 11 and lens 110 were designed and/or constructed using a Non-Uniform Rational B-Splines (NURBS) CAD modeling program, Rhinoceros 2.0 (McNeel Associates, 2001). The photometric effect of each of the lens surfaces was determined using Advanced Systems Analysis Program (Breault Research Organization, 2001), an optical analysis program. Solidworks parametric modeling CAD system was used to facilitate translations between CAD systems. The final design and documentation was performed using Unigraphics CAD system.

What we claim is:

1. A vehicular lamp comprising:
   a housing;
   a single light emitting diode as a light source, adapted to attach to a base of said housing and capable of emitting a minimum flux of approximately 20 lumens;
   a lens, adjacent to said light emitting diode, having a front wall and a side wall, wherein said front wall is spherical and comprises a front surface and a rear surface;
   said rear surface of said lens comprising a plurality of catadioptric prism rings, an aspheric center lens, and a plurality of linear prism optics for distributing the light emitted from said light emitting diode horizontally and vertically;
   wherein the combination of said prism rings, said center lens, and said linear prism optics produce a composite light distribution with a minimum angulation substantially 10° above and below a longitudinal axis of said lamp and a minimum angulation substantially 20° left and right of a vertical axis of said lamp.

2. The lamp according to claim 1 wherein said light emitted from said light emitting diode has a substantially Lambertian radiation pattern.

3. The lamp according to claim 1 wherein said housing and said lens are substantially oval and said lens is adapted to engage with said housing.

4. The lamp according to claim 1 further comprising a heat sink adapted to secure to said housing and adapted to contact said light emitting diode to dissipate heat away from said light emitting diode.

5. A lamp according to claim 1 further comprising a circuit board operatively connected to a power source to provide an input voltage of approximately 13.5 Volts to said light emitting diode.

6. A lamp according to claim 5 further comprising potting material for embedding said light emitting diode and said circuit board.

7. The lamp according to claim 1 wherein said lens is red to allow said lamp to function as a stop, turn and tail lamp.

8. The lamp according to claim 7 wherein said lamp can also function as a marker lamp.

9. The lamp according to claim 1 wherein said lamp is adapted to mount to a vehicle either horizontally or vertically.

10. The lamp according to claim 9 wherein said lamp, mounted horizontally or vertically, satisfies the minimum photometric requirements of the Society of Automotive Engineers Standards J1398 of June 1991 when said lamp is functioning as a stop lamp; the Society of Automotive Engineers Standards J1395 of June 1991 when said lamp is functioning as a turn lamp; the Society of Automotive Engineers Standards J585 of March 2000 when said lamp is functioning as a tail lamp; and the Society of Automotive Engineers Standards J592 of December 1994 when said lamp is functioning as a marker lamp.

11. The lamp according to claim 1 wherein said composite light distribution has a minimum luminous intensity of 16 candelas 10° above and below the longitudinal axis and 5° left and right of the vertical axis; a minimum flux of 10 candelas 5° above and below the longitudinal axis and 20° left and right of the vertical axis; a minimum flux of 30 candelas 5° above and below the longitudinal axis and 10° left and right of the vertical axis; a minimum flux of 70 candelas 5° above and below the longitudinal axis and 0° left and right of the vertical axis; a minimum flux of 40 candelas 0° above and below the longitudinal axis and 10° left and right of the vertical axis; a minimum flux of 80 candelas 0° above and below the longitudinal axis and 5° left and right of the vertical axis; and a minimum flux of 80 candelas 0° above and below the longitudinal axis and 0° left and right of the vertical axis when said lamp is functioning as a stop or turn lamp.

12. The lamp according to claim 1 wherein said composite light distribution has a minimum luminous intensity of 0.4 candelas 10° above and below the longitudinal axis and 5° left and right of the vertical axis; a minimum flux of 0.3 candelas 5° above and below the longitudinal axis and 20° left and right of the vertical axis; a minimum flux of 0.8 candelas 5° above and below the longitudinal axis and 10° left and right of the vertical axis; a minimum flux of 1.8 candelas 5° above and below the longitudinal axis and 0° left and right of the vertical axis; a minimum flux of 0.8 candelas 0° above and below the longitudinal axis and 10° left and right of the vertical axis; a minimum flux of 2 candelas 0° above and below the longitudinal axis and 5° left and right of the vertical axis; and a minimum flux of 2 candelas 0° above and below the longitudinal axis and 0° left and right of the vertical axis when said lamp is functioning as a tail lamp.

* * * * *